United States Patent [19]
Winski

[11] Patent Number: 5,269,645
[45] Date of Patent: Dec. 14, 1993

[54] MATERIAL LOADS AND METHODS FOR HANDLING MATERIAL

[75] Inventor: Ernest P. Winski, Oshkosh, Wis.

[73] Assignee: Kinetic Robotics Inc., Menasha, Wis.

[21] Appl. No.: 690,345

[22] Filed: Apr. 24, 1991

Related U.S. Application Data

[63] Continuation-in-part of Ser. No. 449,235, Dec. 6, 1989, which is a continuation of Ser. No. 102,386, Sep. 29, 1987, abandoned, which is a continuation-in-part of Ser. No. 888,511, Jul. 23, 1986, abandoned.

[51] Int. Cl.$^5$ ............................................. B65G 59/02
[52] U.S. Cl. ............................... 414/786; 53/157; 108/51.1; 206/597; 206/813
[58] Field of Search ............... 53/157; 108/51.1; 206/597, 813, 820; 414/786, 789.5

[56] References Cited

U.S. PATENT DOCUMENTS

| | | | |
|---|---|---|---|
| 2,510,120 | 6/1950 | Leander | 206/813 X |
| 2,744,624 | 5/1956 | Hoogstoel et al. | 206/813 X |
| 3,430,585 | 3/1969 | Grant et al. | 108/51.1 |
| 3,776,145 | 12/1973 | Anderson et al. | 108/51.1 |
| 4,043,097 | 8/1977 | Ishida et al. | 53/157 X |

FOREIGN PATENT DOCUMENTS

| | | | |
|---|---|---|---|
| 55-31782 | 3/1980 | Japan | 414/789.5 |
| 650703 | 2/1951 | United Kingdom | 414/789.5 |

*Primary Examiner*—Michael S. Huppert
*Assistant Examiner*—Janice Krizek
*Attorney, Agent, or Firm*—Thomas D. Wilhelm

[57] ABSTRACT

This invention pertains to handling of material on a supporting surface, preferably a pallet (74). It is addressed especially to the handling of material in pallet loads. The invention provides material handling systems and methods for placing material on a supporting surface by a palletizer (10) and removing it from that supporting surface by a depalletizer (210); and wherein the common element necessary to make the system function resides in the use of a special spacing sheet under each layer (178) of material in the load. Supporting members include spacing sheets (161) and (166) having novel characteristics in their top and bottom surfaces, and novel tacky spacing sheets (300) which are lightly and temporarily bonded to the underlying layer or pallet.

19 Claims, 9 Drawing Sheets

MATERIAL LOADS AND METHODS FOR HANDLING MATERIAL

This application is a continuation-in-part of application Ser. No. 07/449,235, filed Dec. 6, 1989, which is a continuation of Ser. No. 07/102,386, filed Sep. 29, 1987, now abandoned, which is a continuation-in-part of application Ser. No. 888,511, filed Jul. 23, 1986, now abandoned, all of the above being herein incorporated by reference.

BACKGROUND OF THE INVENTION

This invention relates to handling of materials in layers, and especially in layers on pallets and other supporting surfaces. It relates to palletizing materials and subsequently depalletizing those materials, all with a minimum amount of manual lifting on the part of attending labor or machine operators. The invention relates specifically to novel tie sheets and methods for palletizing and depalletizing layers of materials. Individual elements of material being handled may be thin as a single sheet of paper, or thicker as a magazine or a book. The material being palletized/depalletized may also be conventional cartons, boxes, and the like. Particularly with reference to cartons and boxes, the individual elements are susceptible to lateral displacement relative to each other in a layer.

Apparatus for palletizing layers of material is known in the art. A conventional palletizer for boxes or cartons may use a horizontally, reciprocally movable stripper plate for carrying boxes to a position above a pallet onto which the boxes are to be loaded. The stripper plate is then withdrawn from beneath the boxes, thereby depositing them onto the pallet. Retaining means are used for preventing the boxes from moving with the stripper plate as it is withdrawn. Such retaining means commonly include a bar which abuts the side of the boxes facing the direction of stripper plate withdrawal. Structures of this general nature are disclosed in, for example, U.S. Pat. No. 3,149,732 Gagnon et al and U.S. Pat. No. 3,833,132 Alduk.

Palletizing and depalletizing apparatus are disclosed in the following United States Patents.

| | |
|---|---|
| Paxton et al | 2,243,919 |
| Samler | 2,656,047 |
| Locke | 2,875,907 |
| Woodcock | 2,875,908 |
| Keyes | 2,878,948 |
| Lazott et al | 2,937,482 |
| Reed | 2,940,617 |
| Freeman | 2,978,125 |
| Magnuson | 3,105,598 |
| Gagnon | 3,149,732 |
| McWilliams | 3,157,301 |
| Jeremiah | 3,166,203 |
| Kampert | 3,257,006 |
| Bruce | 3,278,048 |
| Roth et al | 3,534,892 |
| Grasvoll | 3,594,977 |
| Larson | 3,606,310 |
| Brockmuller | 3,637,093 |
| Grasvoll | 3,648,857 |
| Carlson | 3,669,282 |
| Von Gal Jr. et al | 3,682,338 |
| Munroe | 3,720,176 |
| Alduk | 3,833,132 |
| Dawson et al | 3,836,018 |
| Golantsev | 3,837,140 |
| Ballard | 3,884,368 |
| Beal | 3,946,883 |

-continued

| | |
|---|---|
| Wilde et al | 3,986,620 |
| Kelley | 4,030,618 |
| Mabey et al | 4,032,021 |
| Schmitt | 4,067,456 |
| Zimmerman | 4,159,058 |
| Schmitt | 4,162,016 |
| Shorthouse | 4,172,686 |
| Schmitt | 4,195,959 |
| Pantin | 4,205,934 |
| Faltin | 4,230,311 |
| Donnelly | 4,234,280 |
| Meratti | 4,255,074 |
| Pulda | 4,339,220 |
| Cox | 4,342,531 |
| Sylvander | 4,383,788 |
| Ishida et al | 4,397,246 |
| Werkheiser | 4,422,549 |
| Werkheiser | 4,439,084 |
| Wise | 4,477,067 |
| Feldkamper | 4,671,723 |
| Liebel | 4,708,247 |
| as well as | |
| Fed. Rep. of Germany | 3,107,495 |
| Japan | 54,129661 |

In U.S. Pat. No. 4,704,060 Winski et al herein incorporated by reference, there is disclosed palletizing apparatus for palletizing stacks of loose materials such as newspapers, signatures, sheets of paper, and the like. Winski et al disclose a stripper plate and plate movement means, for depositing material onto a pallet or onto a partial load of material on a pallet. In that teaching, underlying compressible materials are compressed by the stripper plate during the process of depositing the material. Both the material being deposited and the underlying material are prevented from moving with the stripper plate, by first and second projection means projecting into recessed portions of the top and bottom surfaces of the stripper plate. The pallet load which results from loading a pallet as disclosed therein consists of a plurality of stacks extending from the underlying pallet, or a slip sheet thereon, to the upper extremity of the stack, typically the top of the pallet load. Within that environment of continuous stacks, unloading the material from the pallet is typically done by manual labor. In that process, the material is removed in a series of steps limited by the amount of material a person can manually lift at one time.

Alternatively, unloading can be done by a depalletizer wherein essentially an entire layer of the material is pushed, or swept, off the pallet at one time. The latter case of using a depalletizer is preferred in that it reduces the chance of back injury caused by excessive manual labor at the point of depalletizing, along with the associated savings in labor costs.

However, conventional palletizers do not have the capability to stack loose materials such as newspaper and the like, except as disclosed in above-mentioned U.S. Pat. No. 4,704,060, Winski et al. And to the extent newspapers are stacked on a pallet as in Winski et al, there is not any conventionally known means for removing all of the load with known pallet unloading apparatus.

A problem with depalletizing can arise where it is desirable to remove a series of layers in sequence by pushing them off the load and wherein it is undesirable to physically restrain the intervening underlying interlayer sheet (tie sheet, separator sheet, or spacing sheet) during layer removal by mechanical means such as clamping or abutment.

It is an object of this invention to provide novel spacing sheets, disposed with respective layers of material, and methods of handling layers of material on a pallet with the spacing sheets. In the methods, a plurality of layers can be placed on a pallet by a palletizer, with the novel spacing sheets on top of the respective layers. The novel spacing sheet has low affinity for the respective overlying layer, and higher affinity for the respective underlying layer, such that the overlying layer can be slid off the respective spacing sheet while the spacing sheet remains stationary with respect to the underlying layer in accordance with its affinity for the underlying layer.

SUMMARY OF THE DISCLOSURE

The invention is represented, in a first family of embodiments, by a material load such as a pallet load of material produced at a manufacturing facility. The material load includes a support means, including a supporting surface, a plurality of units of material disposed on the supporting surface, the plurality of units of material, in combination, defining a layer of the units of material; and a tacky spacing sheet overlying the layer of units of material. The units of material underlie the tacky spacing sheet. The tacky spacing sheet has a bottom surface bonded to the underlying units of material by bonds formed between the respective units of material and the tacky spacing sheet. The units of material are thus bonded to each other through the tacky spacing sheet, such that the bonded units of material tend to act in common, through the tacky spacing sheet, to resist outside forces directed against any one or more of the so bonded units of material.

In some embodiments, the tacky spacing sheet comprises a substrate and a tacky layer secured to the substrate, the units of material being bonded to each other through the tacky layer. The tacky layer can, for example, comprise an adhesive coating or a pre-formed layer of a tacky plastic.

The material load can include a second layer of the units of material overlying the tacky spacing sheet. The tacky spacing sheet preferably has a top surface having a coefficient of friction "coft" compatible with sliding removal of the second overlying layer, whereby the bonds between the tacky spacing sheet and the underlying layer hold the tacky spacing sheet to the underlying layer while the second (overlying) layer is being pushed off. The second layer can have a second tacky spacing sheet overlying it and bonded to it, whereby the units of material in the second layer are bonded to each other through the second tacky spacing sheet.

Preferably, the bottom surface of the tacky spacing sheet o a given layer is bonded to the units of material with releasable bonds such that the tacky spacing sheet can be released from the underlying layer of material by peeling the tacky spacing sheet away from the layer. The tacky spacing sheet is typically flexible under bending stresses, and has elongation properties at break in either length or width no greater than the elongation of regular (e.g. non-tacky) 6–30 mil plastic tie sheets such as polyethylene, polypropylene, polystyrene and the like, of corresponding thickness.

The invention is also embodied in a family of methods of handling material on a supporting surface. In a representative embodiment, the method comprises the steps of (i) placing on the supporting surface a set comprising a plurality of units of material, the units of material, in combination, comprising a layer on the supporting surface, the tops of the material, in combination, comprising the top of the layer, (ii) placing, on the top of the layer, a tacky spacing sheet having a tacky bottom surface adapted to releasably bond to the tops of the units of material, and (iii) bonding the tacky spacing sheet to the underlying units of material, with bonds being established between the units of material and the tacky spacing sheet.

The method can further comprise the steps of (iv) removing the so bonded spacing sheet from the units of material, and removing the units of material from the supporting surface.

The method can include first and second sets of units of material and first and second tacky spacing sheets. Each such tacky spacing sheet has a top surface having a coefficient of friction "coft" due to intrinsic properties thereof compatible with sliding removal of overlying units of material therefrom. The method can further comprise placing the second set of units of material on the first tacky spacing sheet, thereby forming a second layer thereon, placing the second tacky spacing sheet on the top of the second layer, and bonding the second tacky spacing sheet to the top of the second layer, with bonds being established between the second tacky spacing sheet and the second set of units of material. Additional layers and respective tacky spacing sheets can be added as desired.

The assemblage thus can comprise two or more layers of units of material, one overlying the other, and a tacky spacing sheet overlying each layer and bonding together the respective units of material of each layer through the tacky spacing sheet. The method can comprise the steps of removing the so bonded top tacky spacing sheet from the top layer, and removing the top layer from the underlying tacky spacing sheet, the bonds between the underlying tacky spacing sheet and the units of material of the layer underlying it being effective to hold the underlying tacky spacing sheet to the layer underlying it while the top layer is being pushed off.

The invention is further embodied in a method of removing material from a material load comprising one or more layers. The method comprises (i) selecting a material load having one or more layers, including a top layer comprising a plurality of units of material which, in combination, comprise a load portion of the top layer, the units of material having tops which, in combination, comprise the top of the load portion of the top layer, and a tacky spacing sheet removably bonded to the tops of the units of material and thereby to the top of the load portion of the top layer, (ii) removing the so bonded tacky spacing sheet from the units of material, and removing at least one of the units of material from the top layer. The removing of material from the load preferably comprises pushing at least one of the units of material off the load.

DETAILED DESCRIPTION OF THE ILLUSTRATED EMBODIMENTS

Figure 1:
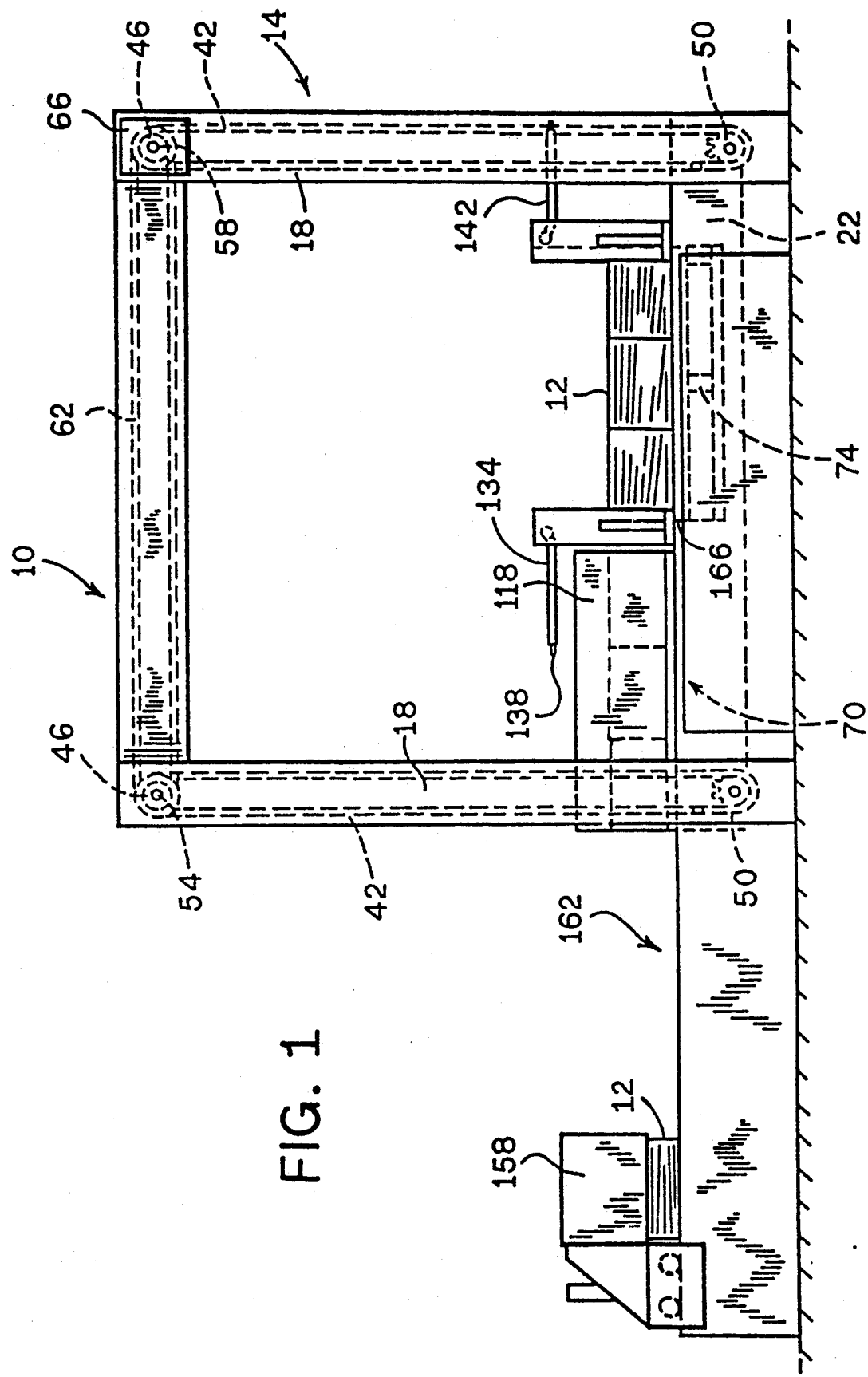
FIG. 1 is a side elevation view of a palletizer useful with the invention.

A palletizer 10 useful with the invention is illustrated in the drawings. The palletizer 10 is usable for depositing a layer of material, such as stacks 12 of loose newspapers on a supporting surface, which is any surface capable of supporting the weight of the load, such as a pallet, a spacing sheet, or a previously deposited stack of material.

Figure 2:
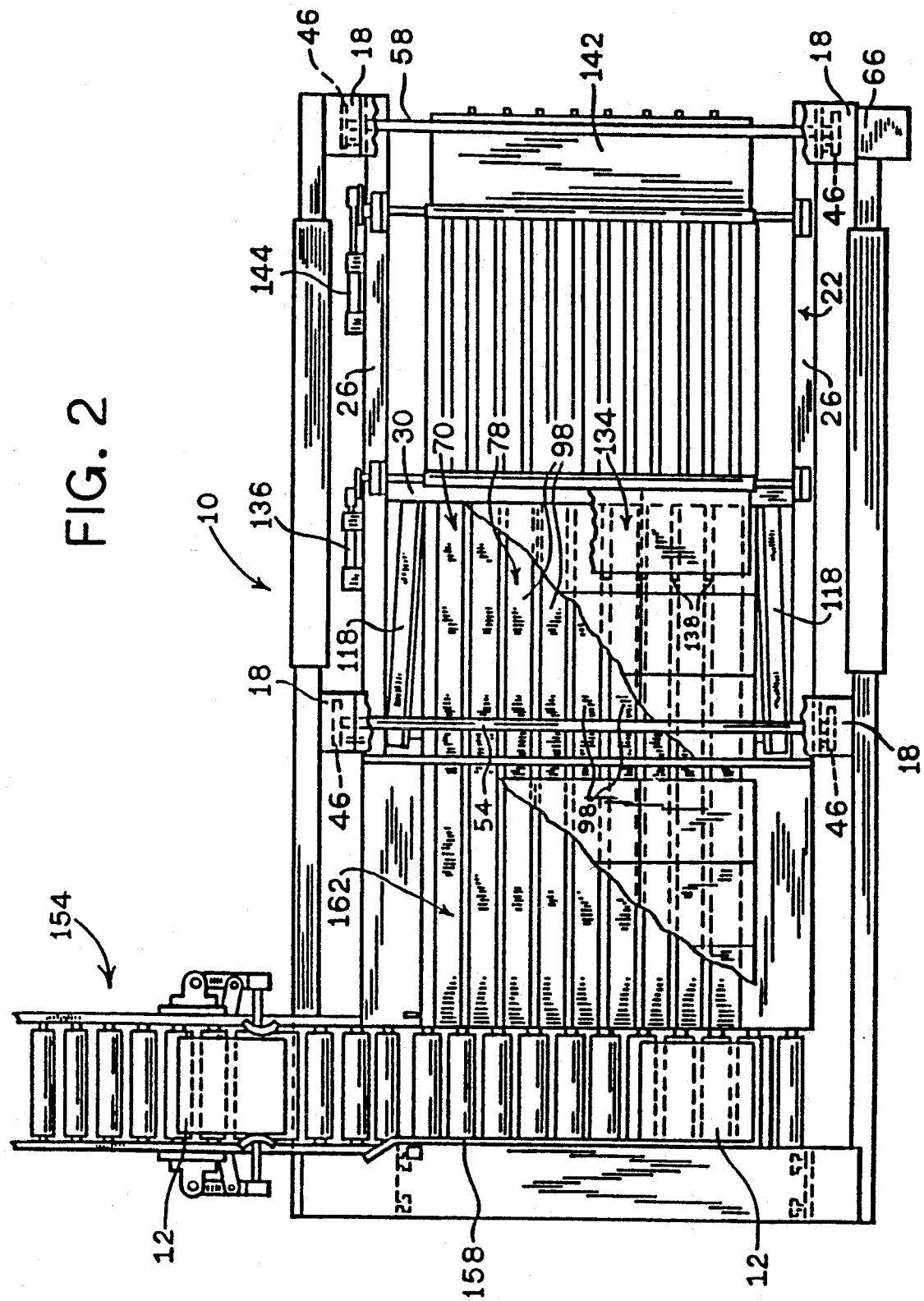
FIG. 2 is a top view of the palletizer of FIG. 1.
Figure 3:
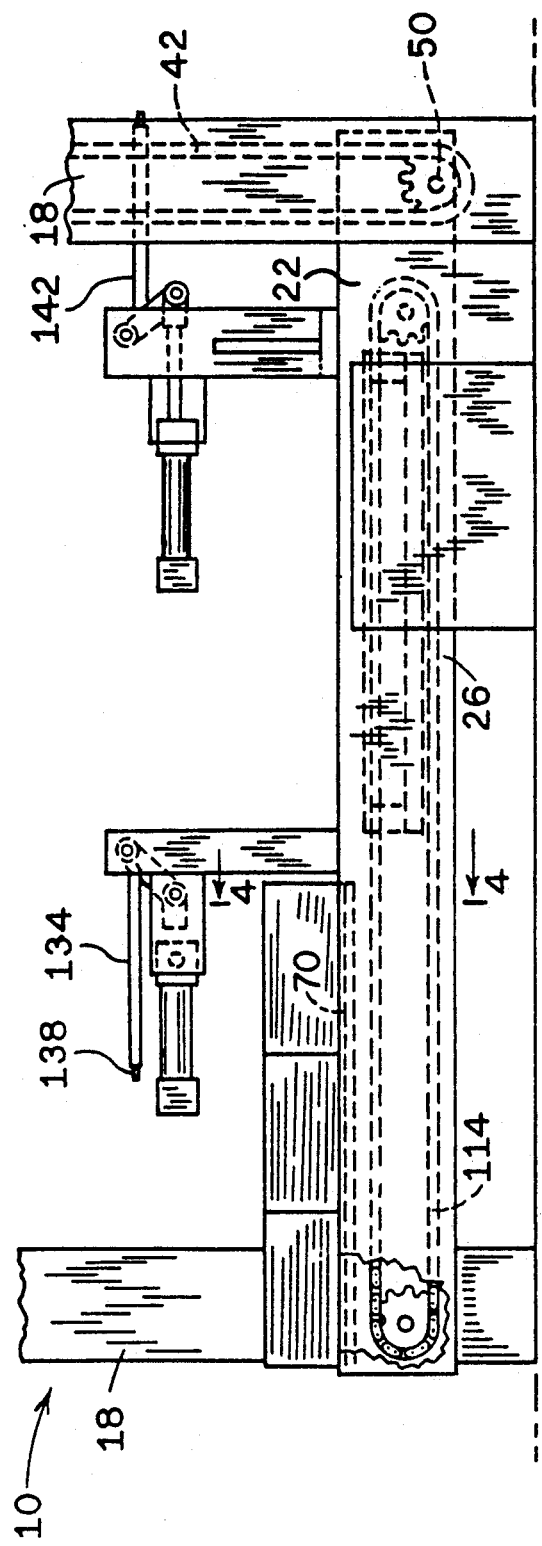
FIG. 3 is a partial side view, partially cut-away, of the palletizer of FIG. 1.
Figure 4:
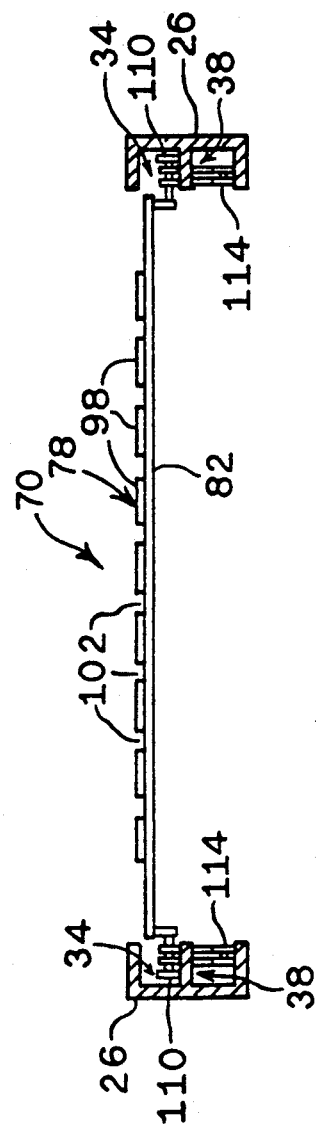
FIG. 4 is a cross-sectional view taken along line 4—4 of FIG. 3, and showing the stripper plate.

As best shown in FIGS. 1-3, the palletizer 10 comprises a frame 14 including four generally vertical members or posts 18 defining the corners of a rectangle. The palletizer 10 also comprises a generally rectangular, horizontally disposed carriage 22 having opposite first and second or right and left ends and four corners respectively connected to the four posts 18 of the frame 14 for vertical movement relative thereto. In the illustrated construction, the carriage 22 includes first and second generally parallel, horizontal, spaced apart side members 26, connected by a central connecting member 30. As best shown in FIG. 4, each of the side members 26 has an E-shaped cross-section and defines upper and lower channels 34 and 38 opening inwardly and having opposed upper and lower generally horizontal surfaces.

Means for reciprocally, vertically moving the carriage 22 relative to the frame 14 includes means on each of the frame posts 18 for causing relative movement of the respective corner and the carriage 22. Preferably, the means on each of the posts 18 includes an endless chain 42 connected to the respective corner of the carriage 22. As best shown in FIG. 1, each post 18 includes an upper drive sprocket 46 and a lower idler sprocket 50. Endless chain 42 is mounted around the sprockets 46 and 50. The upper sprockets 46 of the two left posts 18 (as viewed in FIG. 2) are connected by a drive shaft 54 and the upper sprockets 46 of the two right posts 18 (as viewed in FIG. 2) are connected by a drive shaft 58. Also the upper sprockets 46 of the two right posts 18 (as viewed in FIG. 2) are connected by an endless drive chain 62 to the upper sprockets 46 of the left posts 18 (as viewed in FIG. 2). Drive chain 62 is shown in FIG. 1. Drive means 66 is connected to the drive shaft 58 to drive the two right chains 42, and via the endless chain 62 and the drive shaft 54, the two left chains 42. Accordingly, the four endless chains 42 move in common, thereby causing common vertical movement of the four corners of the carriage 22.

A generally horizontal stripper plate 70 is mounted on the carriage 22 for reciprocal horizontal movement relative to the carriage 22 between a first or right position (FIG. 6) wherein the stripper plate 70 is adjacent the first or right end of the carriage 22 and a second or left position (FIGS. 2-3 and 5) wherein the stripper plate 70 is adjacent the second or left end of the carriage 22. A pallet 74 is placed beneath the first position of the carriage 22 so that when the stripper plate 70 is in the first position it is above the pallet 74. The stripper plate 70 includes an upwardly facing surface 78 (FIG. 4) adapted to carry the articles or stacks of papers to be palletized, during movement of the stripper plate 70 from the second or left position to the first or right position. The stripper plate 70 also includes a downwardly facing surface 82.

Upper surface 78 has a plurality of generally parallel, spaced-apart, low-friction strips 98 extending in the direction of stripper plate movement and wherein the upper surfaces of strips 98 combine to define the upwardly facing surface 78 of the stripper plate 70, with the spaces between the strips 98 defining channels 102 in the upwardly facing surface 78. In the illustrated construction, the carriage 22 includes a pair of guide members 118 (FIG. 2) for assisting in positioning stacks of material on the stripper plate 70.

Preferably the stripper plate 70 is mounted on carriage 22 by a first pair of wheels 110 rotatably mounted on one side of the stripper plate 70 and received in the upper channel 34 of the left carriage side member 26 (FIG. 4) for rolling movement along channel 34, and a second pair of wheels 110 rotatably mounted on the right side of the stripper plate 70 and received in the upper channel 34 of the right carriage side member 26 for rolling movement along its channel 34.

Means for horizontally moving the stripper plate 70 between the first or right position and the second or left position includes, on each of the side members 26 of the carriage 22, an endless chain 114 extending through the upper and lower channels 34 and 38 and connecting to the stripper plate 70. The endless chains 114 are connected to a common drive means (not shown).

Means for stopping downward movement of the carriage 22 relative to the spacing sheet includes an electric eye 128 (FIG. 5) and associated sensor mounted on carriage 22, and conventional control means for stopping downward movement of the carriage 22 when the circuit between the electric eye and the sensor is interrupted by the underlying load or pallet.

Figure 5:
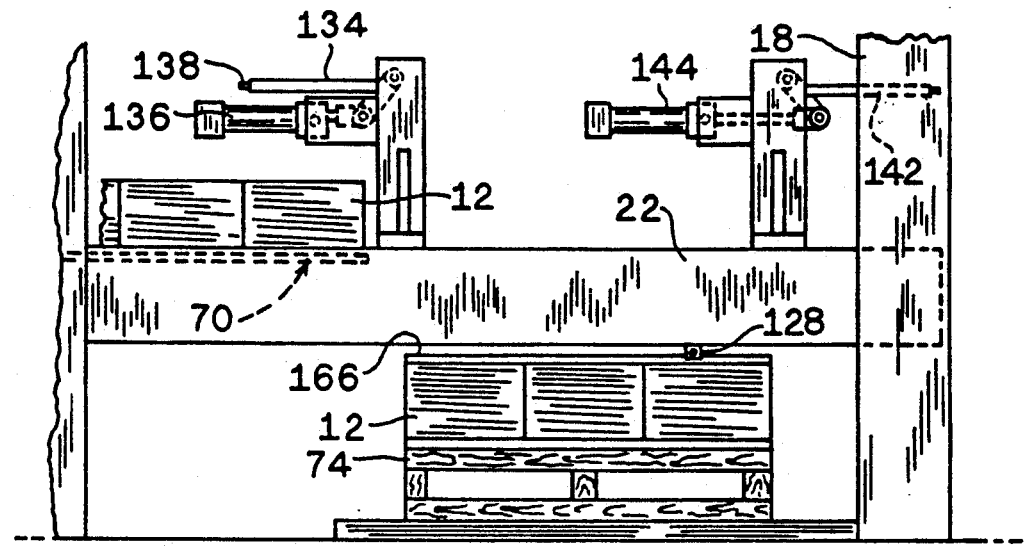
FIGS. 5–7 are partial side views of the palletizer of FIG. 1 showing sequential operation thereof.
Figure 6:
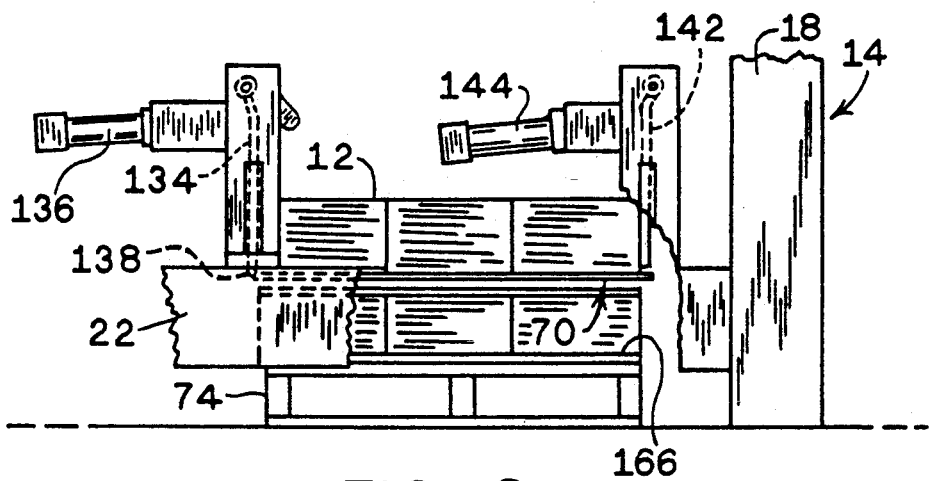

A first retaining plate 134 for preventing the layer of material which is on stripper plate 70 as in FIG. 6 from moving with the stripper plate 70 as the stripper plate 70 is withdrawn from the first position to the second position (from right to left as in FIG. 7), includes projecting or combing fingers 138 extending downwardly into the recesses 102 in the upwardly facing surface 78 of the stripper plate 70 for retaining the lowermost elements of e.g. stacks of papers against horizontal movement with the stripper plate 70 as the stripper plate is withdrawn. In the illustrated construction, the first retaining plate 134 is pivotally moveable between a raised position (FIG. 5) wherein the plate 134 is parallel to the stripper plate 70, and a lowered position (FIG. 6) wherein the plate 134 is perpendicular to the stripper plate 70. Pneumatic cylinder 136 moves the plate 134 between the raised and lowered positions. Plate 134 and its fingers 138 generally restrain the overlying layer of material as the stripper plate 70 is withdrawn.

The carriage 22 also includes a second retaining plate 142 similar to the first retaining plate 134 for retaining the layer of papers when the stripper plate 70 is in the first or right position. Pneumatic cylinder 144 moves the retaining plate 142 between its raised and lowered positions.

In-feed conveyor 154 (FIG. 2) extends generally perpendicular to the direction of movement of the stripper plate 70, and is disposed a short distance from the left end of carriage 22. In the illustrated construction, the conveyor 154 is a conventional roller conveyor. Other conventional types of conveyors may be selected for use as desired.

In the preferred embodiment, the palletizer 10 includes a staging station 162 (FIG. 2) between the end of conveyor 154 and the stripper plate 70 (when the stripper plate is in the second or left position). Staging station 162, optionally in combination with the adjacent end of in-feed conveyor 154, permits an entire layer of material to be arranged before being pushed onto the stripper plate 70.

Rows of material are formed at the end of conveyor 154, and are moved from the in-feed conveyor 154 onto the staging station 162, and subsequently onto the stripper plate 70 by a pusher 158 which is reciprocally moveable across the in-feed conveyor 154 and the staging station 162 in the direction of movement of the stripper plate 70. In the preferred embodiment, the pusher 158 includes a plurality of fingers (not shown) extending downwardly between the rollers of the in-feed conveyor 154 to insure that all elements of material are pushed off the conveyor 154.

Figure 8:
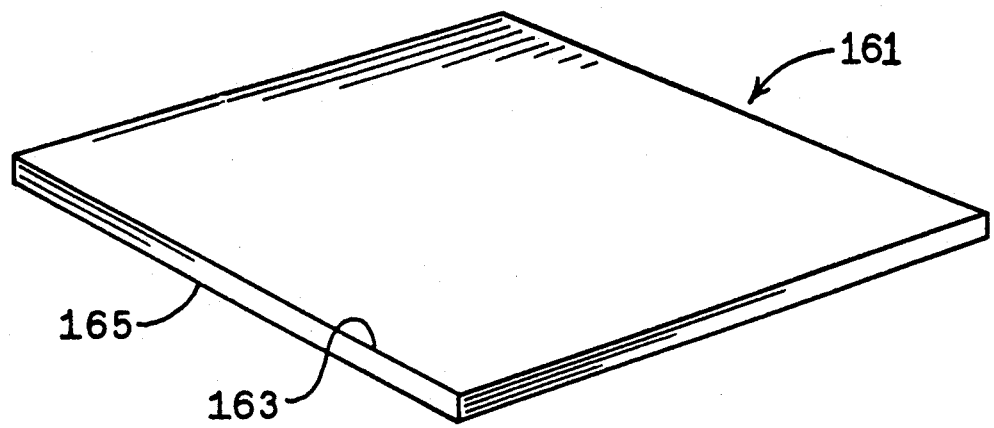
FIG. 8 shows a pictorial view of a novel spacing sheet used in this invention.

The palletizer 10 is used in combination with novel spacing sheets such as those illustrated in FIGS. 8-10 and 17-18. Referring first to FIG. 8, the spacing sheet 161 has a top surface 163 which is adapted for sliding loads of material onto and off of the sheet 161. The top surface 163 is adequately smooth for facile sliding of paper-type products, yet not so slippery as to cause unintentional sliding which could cause spillage of the load, or even a shifting which would cause the load to be unbalanced, and thus affect safe lifting and transporting of the load without spillage. The degree of smoothness of the top surface is selected to complement the properties of the lower surface of the load materials which it carries. Bottom surface 165 of spacing sheet 161 preferably is characterized as a relatively higher friction surface which discourages sliding along the bottom surface.

It is generally desirable, especially in embodiments where the uncovered top of the underlying layer is uneven and compressible, that the spacing sheet be functionally rigid, and have significant weight. The rigidity enables the spacing sheet to hold its planar configuration in use, without localized contour changes, as measured at a surface thereof, in response to surface configurations of the underlying or overlying load. Accordingly, the top of the spacing sheet provides a generally planar surface for receiving the bottom of the layer to be placed on it. The significant weight of the spacing sheet effects a partial preliminary compression of any compressible material in the underlying layer in preparation for receiving the next, or overlying layer. This partial preliminary compression, when applicable, tends to densify and stabilize the underlying layer while the spacing sheet is in place on top of the underlying layer.

Localized surface contours and the responsive adjustments in the spacing sheet surface, in adaptation to the adjacent load surfaces, are herein defined as those contours which deflect the surface by at least 0.2 inch and are wholly contained within a radius of 3 inches about the corresponding surface contours in the layers underlying or overlying the spacing sheet. Localized surface contours and changes in those contours are readily observed when typical slip sheets and tie sheets, made from paper having a basis weight of e.g. 40-200 lbs./3000 square foot ream are used under or over uneven layers of material.

Fully satisfactory spacing sheets 161 may be made from a fibrous board commonly used in the construction industry and known as Masonite. Masonite has one smooth surface, good for use as top surface 163, and an opposing rougher surface which carries the marks of its forming wire, good for use as bottom surface 165. Masonite can be purchased in varying thicknesses, with the preferred thickness of 0.25 to 0.50 inch being readily available.

The thickness of the spacing sheet between is top and bottom surfaces, whatever its construction, should be no more than about 1.0 inch. Thickness of at least 0.125 inch is generally necessary for adequate durability when a pressed fibrous material such as Masonite is used. 0.125 inch Masonite is also fairly rigid and fairly free from susceptibility to localized contour changes. At over 1.0 inch, the weight and cost tend to be excessive, though it is functionally satisfactory. And so thicker sheets are part of this invention, though they are not preferred.

Figure 9:
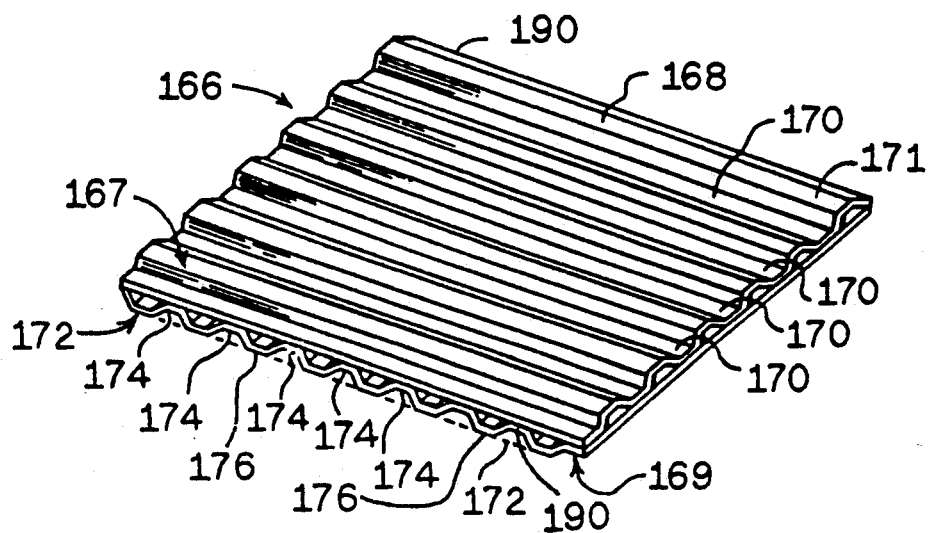
FIG. 9 shows a pictorial view of another novel spacing sheet used in this invention.

For use with sheet materials, a spacing sheet such as that seen at 166 in FIG. 9 is used. Spacing sheet 166 has a top surface 168 similar to top surface 78 of stripper plate 70, and has a plurality of generally parallel channels 170 and corresponding ridges 171 extending generally across the top surface 168.

The spacing sheet 166 also has a bottom surface 172. Bottom surface 172 defines the downwardly facing surface of the spacing sheet which faces generally away from top surface 168. Bottom surface 172 has a plurality of channels 174 and corresponding ridges 176 extending generally across it. The top and bottom surfaces of spacing sheet 166 are generally defined at the extremities of those surfaces as they are farthest spaced from each other. Thus the top and bottom surfaces are physically discontinuous over the areas of channels 170 and 174, and are generally defined as the planes in which the physical upper and lower facing surface elements 171 and 176 reside; and generally define the loci of planes of interaction between the spacing sheet and the respective underlying and overlying layers.

Figure 10:
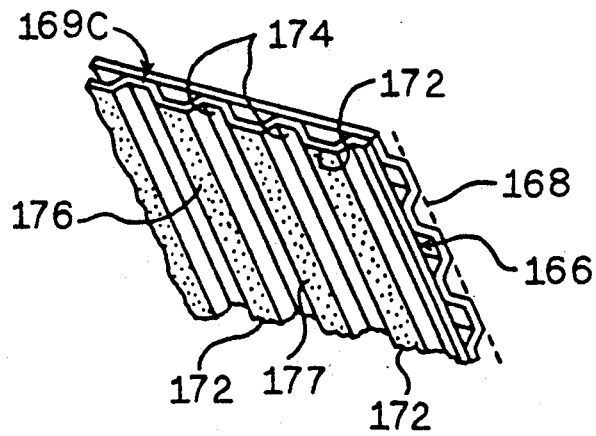
FIG. 10 shows a pictorial view of the bottom of a portion of the spacing sheet of FIG. 9.

In some embodiments, channels 170 and 174 in the top and bottom surfaces respectively are preferably oriented perpendicular to each other in the spacing sheets 166, which are preferred for use in the method of the invention with compressible load materials. In other embodiments, they are preferably parallel. As seen in FIG. 10, ridges 176 may have projections 177 thereon. The projections may comprise roughness of the surface of the material from which the elements of the bottom surface 172 are made. They may include materials adhered to the ridges 176. Typical of such adhered materials are sand and grit, or the like, adhesively attached to the ridges 176.

In any event, it is preferred in some embodiments that the bottom surface 172 of the spacing sheet have a coefficient friction "cofb" measurably greater than the coefficient of friction "coft" of the top surface 168. Coefficient of friction is determined by placing two similar surfaces against each other and measuring the sliding friction, due to intrinsic properties of the surfaces, as the surfaces slide relative to each other, and with a given force urging the surfaces toward each other. In general, the sliding properties of the top surface 170 correspond with the sliding properties previously described for top surface 163 of sheet 161.

The palletizer 10 operates generally as follows, with sheet-type load materials. A pallet 74 is placed beneath the right end of the frame 14 as shown in FIG. 1. A spacing sheet 166 is placed on the pallet 74. The spacing sheet is oriented relative to the pallet such that the channels 170 in the top surface 168 are oriented to extend in a direction compatible with the subsequent depalletizing operation. Individual stacks 12 of paper or other sheet material are transported to the palletizer 10 by the in-feed conveyor 154 as shown in FIG. 2. When an entire row of stacks is assembled at the end of the in-feed conveyor 154, the pusher 158 pushes the row of stacks onto the staging station 162. This process continues until an entire layer of material has been accumulated. Then, with the stripper plate 70 in the left position, or adjacent the staging station 162, and with the carriage 22 at a height such that the stripper plate 70 is generally level with the stating station 162, the pusher 158 pushes the entire layer of stacks of paper onto the stripper plate 70.

Figure 7:
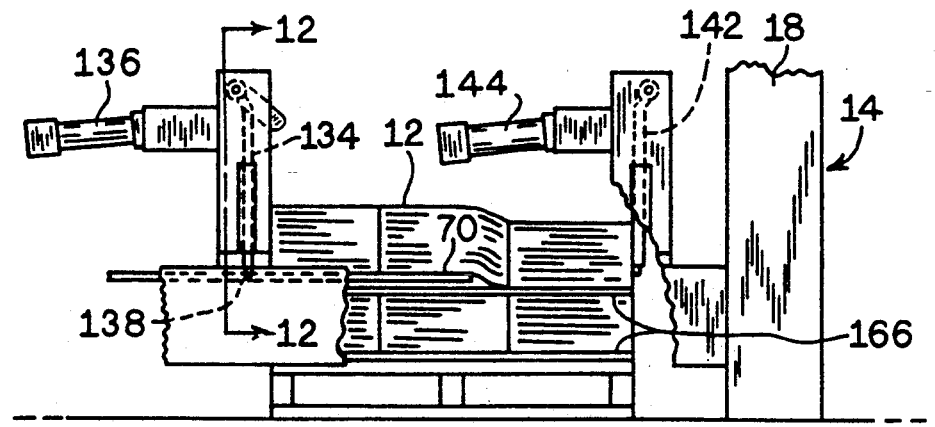

The carriage 22 then moves to a height above the spacing sheet 166 on the pallet (or above the spacing sheet placed on a previously deposited layer) as shown in FIG. 5 and the stripper plate 70 moves to the right, such that it is positioned above the pallet. The carriage 22 is lowered until the stripper plate 70 and its layer of material are proximate the top of the underlying spacing sheet on the underlying pallet or load. The lowering of carriage 22 is stopped by the underlying load interrupting the circuit set up through electric eye 128. This position is shown in FIG. 6. When the circuit is interrupted, the carriage proceeds downwardly a pre-set distance to bring stripper plate 70 proximate the top of the underlying load or pallet. With the retaining plates 134 and 142 in the lowered position, the stripper plate 70 is withdrawn from the right to the left, as shown in FIG. 7.

As stripper plate 70 moves to the left, the friction between the top surface 78 of the stripper plate and the corresponding overlying layer of material tends to drag those respective stack elements (e.g. paper sheets) which are located adjacent the stripper plate along with the stripper plate. With the left retaining plate 134 lowered, the fingers 138 project into channels 102 in the stripper plate 70, and the combination of retaining plate 134 and fingers 138 prevents even the lowermost ones of the sheets in the stacks of papers on the stripper plate 70 from moving with the stripper plate 70. Also as the stripper plate 70 moves from right to left, the stacks 12 of material drop down onto the underlying spacing sheet 166, as shown in FIG. 7.

When the stripper plate 70 reaches the left position, the retaining plates 134 and 142 are returned to the raised position, and the carriage 22 is returned to the position in which the stripper plate 70 is level with the staging station 162. The above steps are repeated, depositing additional layers onto the load, until the pallet is as full as desired. When the desired quantity of material has been loaded onto the pallet, and wherein each layer of the material is underlain by a spacing sheet 166, the pallet load 179, including pallet, spacing sheets, and layers of material is removed from the palletizer.

Figure 11:
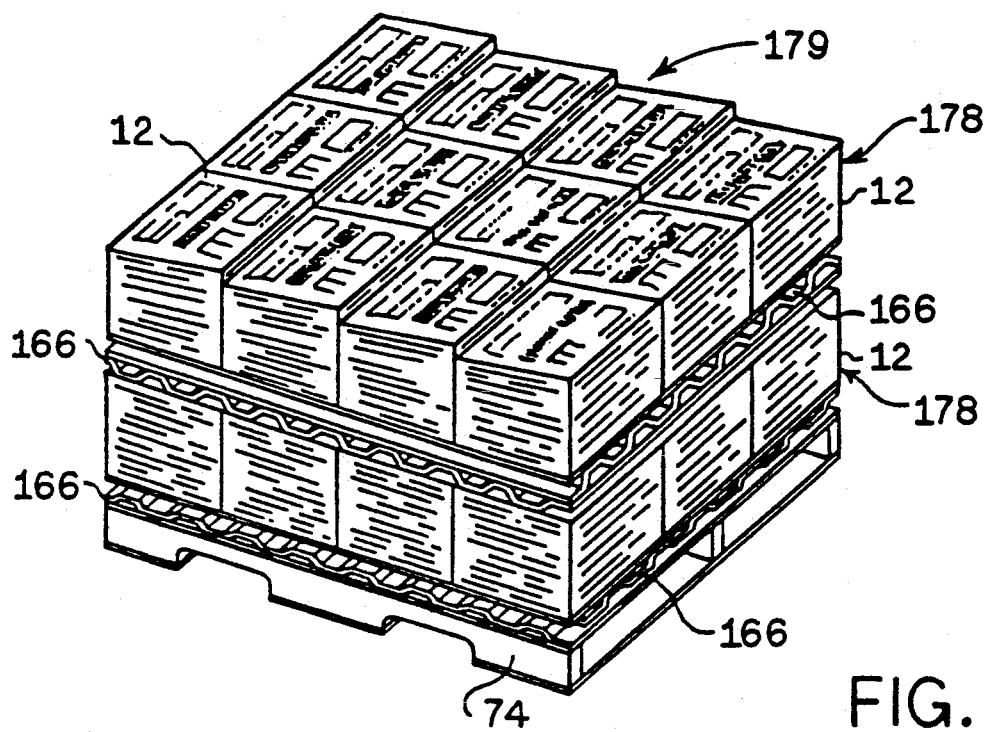
FIG. 11 shows a loaded conventional pallet wherein the pallet load includes a plurality of layers of material and a spacing sheet of FIG. 9 under each layer.
Figure 12:
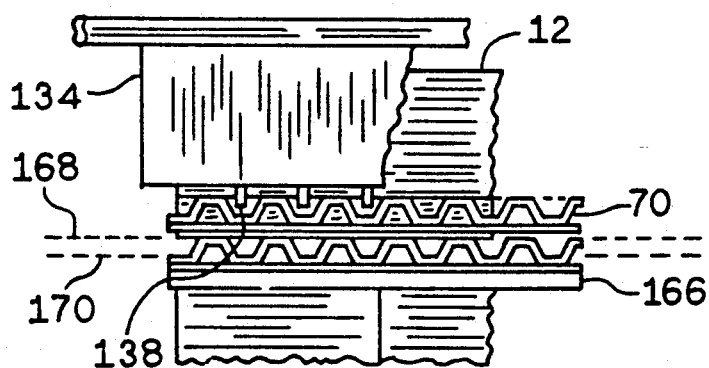
FIG. 12 is a cross-sectional view taken along line 12—12 in FIG. 7, and showing fingers of the retaining plate projecting into the channels on the top surface of the stripper plate.

The pallet load 179, as it leaves the palletizer, appears typically as seen in FIG. 11; in which each layer 178 is underlain by a spacing sheet 166, and the bottom spacing sheet is supported by the pallet 74. Where other support means is available, pallet 74 can be eliminated. Alternatively, the bottom spacing sheet can, in some cases, be eliminated if the pallet contains the requisite channels. Such a pallet is taught in U.S. Pat. No. 3,720,176 Munroe, herein incorporated by reference.

It is important that the spacing sheet 166 be compatible with use in both the palletizer and the depalletizer equipments, such as the equipments seen in FIGS. 1-7 and 12-16 Referring now to FIG. 11, it is seen that channels 170 in the upper spacing sheet 166 are oriented in the same direction as channels 170 in the lower spacing sheet 166. It will be seen hereinafter that the orientation of channels 170 facilitates the removal of the layers of material from the pallet.

Many of the structural components of the depalletizer 210 illustrated in FIGS. 13-16 are similar to corresponding structural components of palletizer 10 of FIGS. 1-7 and 12. Accordingly, a palletizer may be designed to also perform the depalletizing operation, when fitted with appropriate adaptations and operating controls. In the event the palletizer being used is capable of performing the depalletizing operation, then the locations of the palletizing and depalletizing operations can be the same.

Figure 13:
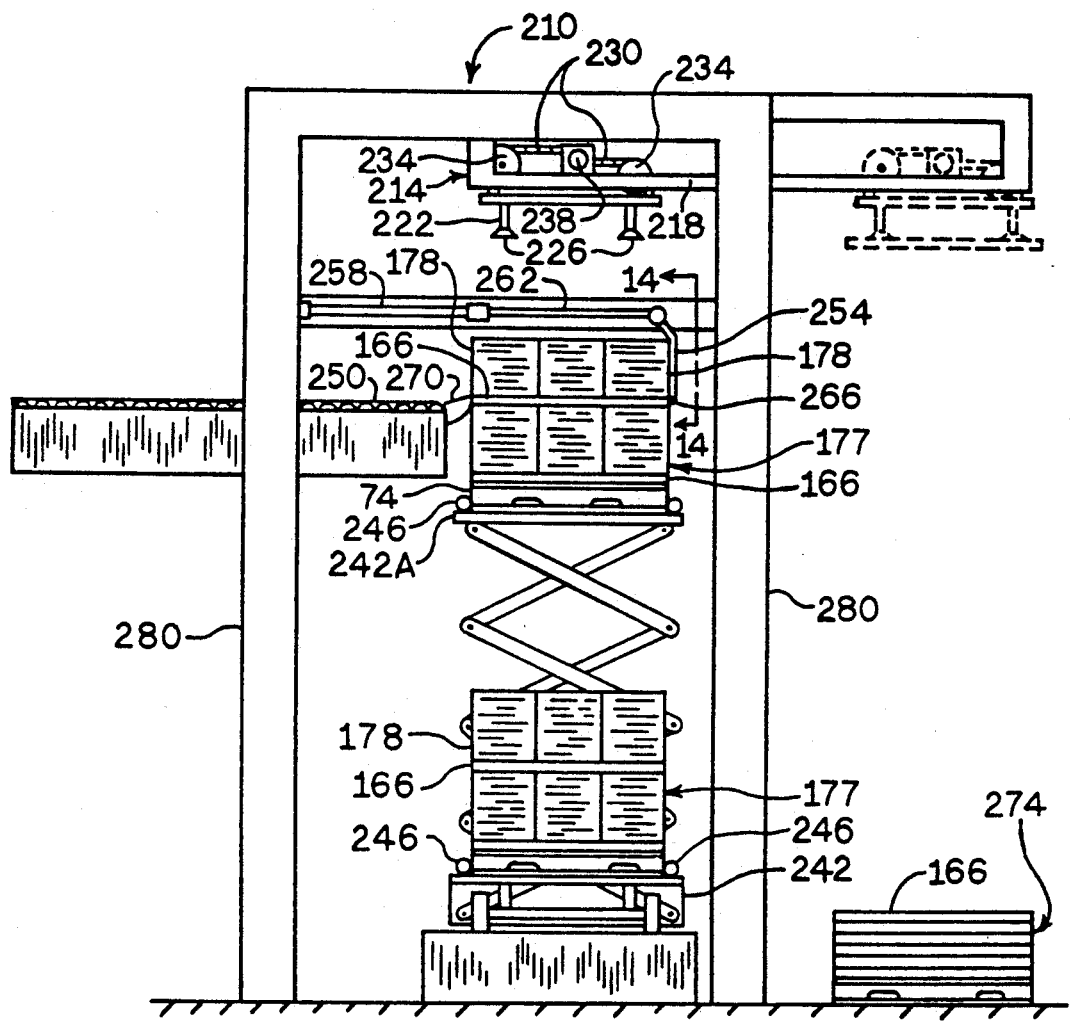
FIG. 13 shows a side elevation view of a depalletizer used in the invention, with the top layer of material in position to be pushed off the spacing sheet, and thus off the pallet.

Referring now to FIG. 13, a spacing sheet removal apparatus 214 includes a primary remover frame 218 and a pickup framework 222 including suction cups 226. Pickup framework 222 is suspended from primary frame 218. Chains 230 extend upwardly from framework 222 over pulleys 234 to motor 238. Motor 238 dispenses and winds up chains 230 in raising and lowering pickup framework 222. Pickup framework 222, chains 230, pulleys 234, and motor 238 are slidably mounted on frame 218 whereby they can be moved along frame 218 such as to the phantom position as shown in FIGS. 13.

A depalletizing operation will now be described in sequence. The ordinary guards and lateral stabilizers have been omitted for ease of visualizing and understanding the operations of both the palletizer 10 and the depalletizer 210.

A pallet load 179 is placed onto a pallet table 242 as seen in FIG. 13. FIG. 13 shows one pallet table 242 lowered, and a second pallet table 242A raised, as described hereinafter. Any means may be used in lifting table 242, including a chain suspension as for carriage 22 in palletizer 10 of FIG. 1.

The pallet is positioned on the pallet table through engagement of stops 246. If the respective pallet table 242 on which the pallet has been loaded is not horizontally adjacent removal conveyor 250, such that it can be raised to a position directly adjacent the removal conveyor, then the pallet table 242 is moved laterally in the appropriate direction to bring the pallet into a position horizontally adjacent removal conveyor 250.

Once the loaded pallet and its pallet table have been brought into a position horizontally adjacent removal conveyor 250, the height of the respective pallet table 242, with the pallet and its load, is adjusted by raising pallet table 242 such that the load is indexed into a position directly and physically adjacent removal conveyor 250 as seen at 242A in FIG. 13. In that position the bottom of the top layer 178 is more or less level with the top of removal conveyor 250. Preferably the bottom of the top layer 178 is slightly above the plane of the top of conveyor 250. Pusher 254 is then moved into a vertical position as shown in FIG. 13.

Figure 14:
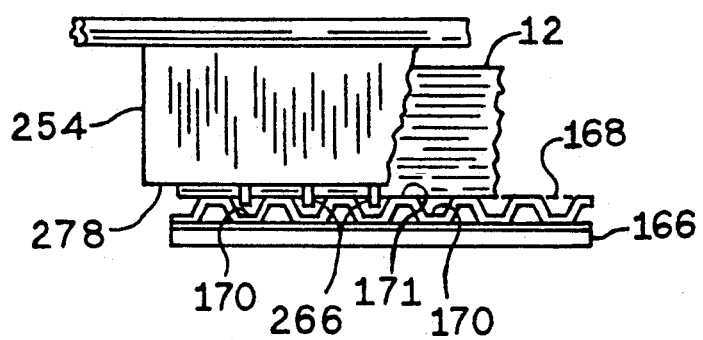
FIG. 14 is a partial elevation view taken at 14—14 of FIG. 13, and showing fingers of the pusher projecting into the channels in the top surface of the spacing sheet.

Cylinder 258 is activated, withdrawing rod 262 and thereby drawing pusher 254 with it, thus pushing the top layer 178 off the load and onto the removal conveyor 250. As pusher 254 pushes the layer 178 off, fingers 266 extend below the bottom of the layer and into channels 170 on the spacing sheet 166, but are spaced from the surfaces of channels 170 as seen in FIG. 14. Accordingly, the bottom members of the layer are assuredly contacted, and moved concurrently with the rest of the layer.

While contents of the pallet are being pushed off, retainer 270 abuts spacing sheet 166 along the corresponding edge of the spacing sheet which is adjacent conveyor 250. As the layer 178 is pushed toward retainer 270, and off the load, retainer 270 prevents the spacing sheet, and the rest of the load, from being displaced laterally. It is important that the load be properly indexed adjacent retainer 270 such that retainer 270 is able to abut spacing sheet 166, and thereby prevent substantial movement of materials underlying the layer which is being pushed off, without impeding movement of the materials over retainer 270 and onto conveyor 250. Where loose material, such as stacks 12 of newspaper, are being depalletized, restraint of particularly the uppermost newspapers underlying the spacing sheet is needed. These layers are readily restrained by so indexing spacing sheet 166 adjacent retainer 270 that spacing sheet 166 abuts retainer 270 and thereby transfers the residual pushing stress to the retainer as seen in FIG. 13. In that regard, the pushing stress is transferred by friction, from the load being pushed off, to spacing sheet 166, and, by abutment with retainer 270, from spacing sheet 166, to retainer 270. The layers of material underlying spacing sheet 166 accordingly experience minimal, if any, stress from the pushing action, and thus do not require direct edge restraint contact.

In order for retainer 270 to act appropriately on a spacing sheet, the spacing sheet must have enough thickness and rigidity that it can be positioned in surface-to-surface contact with retainer 270 and maintain that contact while the overlying layer of material is being removed; without slippage, or buckling, or other damage to the spacing sheet or retainer as the overlying layer is being removed. Concurrently, the top surface 168 of the spacing sheet should be level with, or slightly above, retainer 270 to permit sliding the load contents from the top surface 168 of spacing sheet 166, onto and across retainer 270, and onto conveyor 250. A minimum thickness for spacing sheet 166 for use with retainer 270 is thus about 0.25 inch. Thinner spacing sheets can be used, especially with other means to restrain the sheet during depalletizing, but the difficulty in satisfactorily locating a thinner sheet vertically with respect to retainer 270 and thereby indexing it, makes use of thin sheets with retainer 270 somewhat difficult. A spacing sheet having a thickness of 0.375 inch is better for use with retainer 270; 0.75 inch is preferred. Thicknesses as high as 1 inch are contemplated as being practical. Thicknesses greater than 1 inch will work, but spacing sheets of those designs will be more costly and will generally unnecessarily increase the height of the pallet loads in which they are used.

After the top layer is removed, pallet table 242A is raised to an appropriate height for removal of the underlying layer. Pickup framework 222 of spacing sheet remover 214 comes down to the top spacing sheet 166 and picks it up by suction cups 226. After spacing sheet 166 is adequately raised, it is moved laterally away from the pallet load as seen in phantom in FIG. 13 and is lowered onto the stack 274 of spacing sheets.

Figure 15:
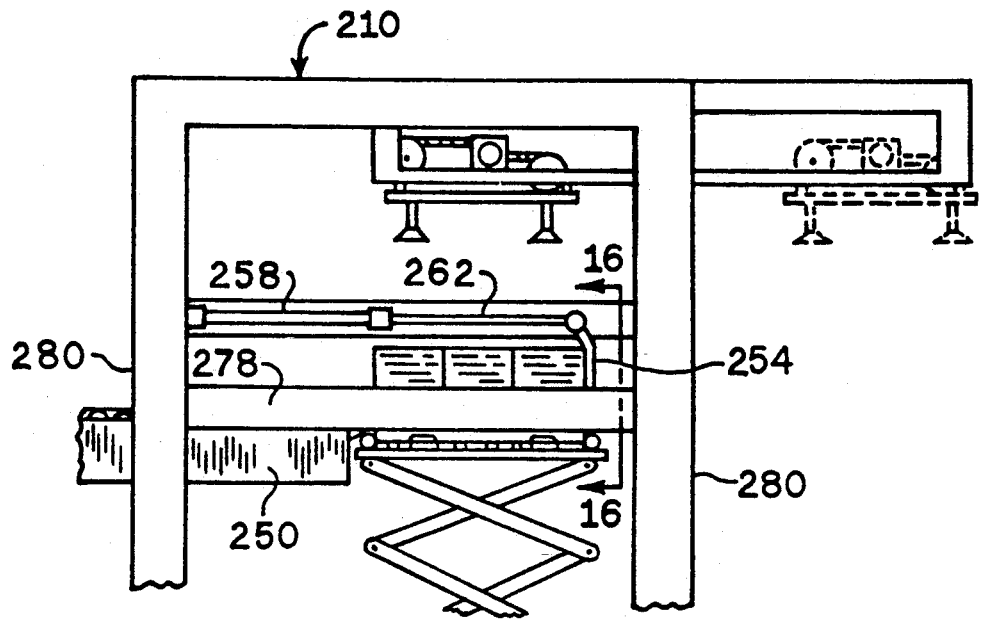
FIG. 15 is a side elevation view as in FIG. 13 (partially cut away) with the pallet having been further raised for removal of the bottom layer of material.

After the top spacing sheet has been removed, pusher 254 pushes the remaining layer 178 off the pallet in a manner similar to the pushing off of the previous layer, and as shown in FIG. 15. The remaining spacing sheet 166 is removed as described above, if desired. The previous steps of adjusting the height, pushing off one layer at a time, and removing the underlying spacing sheet, are repeated as necessary, to remove the desired amount of material from the pallet.

With respect to handling thin-section load materials which are typically compressible, the material handling process is seen to revolve about the use of the spacing sheet 166, and the ability to put material onto the spacing sheet in the palletizer by automatic means and to remove it from the spacing sheet in the depalletizer; such that materials can be loaded onto the pallet, and later removed from the pallet, all without the necessity of the materials being physically handled by an operator or a laborer.

In one family of embodiments of the overall process of the invention, which is used to handle pallet loads of loose stacks of newspapers, a spacing sheet 166 is placed on the pallet in the palletizer with its channels 170 oriented in a direction predetermined for ease of unloading material from the spacing sheet in the anticipated subsequent unloading environment. A layer of loose stacks of e.g. newspaper is then placed on the spacing sheet. A second spacing sheet is placed on the top of the so-placed first layer of newspapers. The second spacing sheet is similarly oriented with respect to the direction of unloading material from the second spacing sheet. The weight of the (second) overlying spacing sheet 166 is normally adequate to compress the underlying layer to bring the top of that layer to a generally uniform height. After the second spacing sheet has been placed with proper orientation, a second layer of loose stacks of e.g. newspapers is placed on the second (overlying) spacing sheet.

This sequence is repeated until the desired number of layers has been placed on the pallet to thereby create the pallet load. The pallet load of material is then placed in storage.

At the time when the material on the pallet is to be further used or worked on, the loaded pallet is brought out of storage and is transferred to the depalletizer 210 wherein the load is removed from the pallet as hereinabove described. All the above activity of palletizing and depalletizing can take place without any manual labor of lifting material onto the pallet or off the pallet.

In a highly automated system, the multiple step process of removing the loaded pallet from the palletizer, storing it, and subsequently recalling it from storage and delivering it to the depalletizer can also be performed without any human intervention other than operation of the controls of conventional material handling storage and retrieval apparatus.

As indicated above, it is preferred that the spacing sheets be oriented, at the time they are made part of the pallet load, in a direction to readily accommodate the preferred direction of unloading of the respective layers, in a given load, in the depalletizer. In the alternative, the spacing sheets may be incorporated into the pallet load without regard to the direction of unloading in the depalletizer, so long as the layer on each spacing sheet is compatible with sliding in the direction of unloading of the respective spacing sheet. Also, if the material is to be lifted in a generally vertical direction off the spacing sheet, then orientation of the channels 170 for sliding removal is not critical. To the extent the channels 170 are not aligned in the palletizing operation, for direction of unloading, and when channel orientation is important to the unloading/ depalletizing process, the pallet may be rotated/oriented prior to removing the material from the spacing sheet, to properly align the channels 170 for the depalletizing operation.

With respect particularly to the depalletizing operation, the preferred process embodies sliding the load material off the top surface of the corresponding spacing sheet. In order to effect the sliding, it is necessary that the top surface which is in contact with the load material have a sufficiently low coefficient of friction with respect to the load material that the load material can readily be pushed off the top surface with a modest amount of force, as by pusher 254. As the functional coefficient of friction depends not only on the inherent properties of surface 168, but also on the characteristics of the load being carried, the absolute measured coefficient of friction for any given surface 168, or a corresponding upper surface of a spacing sheet 161 or the like, varies as an engineering adjustment to the characteristics of the load to be carried. Thus the term "low coefficient of friction" is defined as that surface friction characteristic which readily accommodates the sliding removal of the carried load.

In the embodiments discussed hereinabove, retainer 270 is used to restrain the underlying portion of a load so that it remains on the pallet while the top layer is being pushed off. In that regard, the retaining is by means of abutment. Where the overlying material is easily slid off the load, and the bottom surface of the spacing sheet has adequate friction, such as bottom surface 165 of spacing sheet 161, and given good load stability, in some cases no specific restraining of the supporting member (e.g. pallet or spacing sheet) is required.

Figure 16:
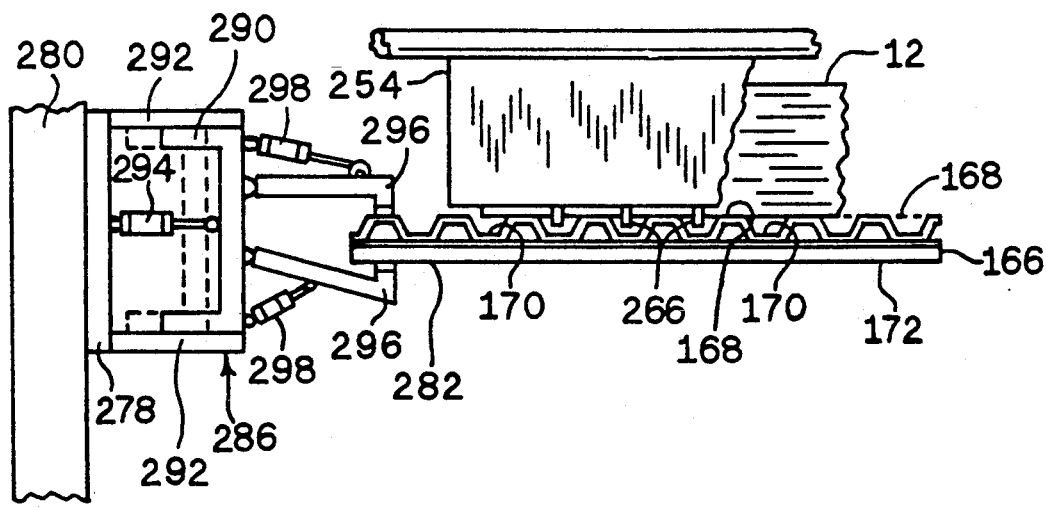
FIG. 16 shows a clamping mechanism for holding the spacing sheet in position in the depalletizer.

FIG. 16 illustrates clamping as another means of restraining the underlying load. In FIG. 16, a horizontal frame member 278 extends between posts 280 of the depalletizer 210. One or more clamping mechanisms 286 are mounted on frame member 278 for clamping an extended edge 282 of spacing sheet 166 while the overlying load is being pushed off. For using this embodiment of the invention, spacing sheet 166 is wider than the load by an amount sufficient to provide a free edge for gripping as at 282.

Clamping mechanism 286 comprises a clamp holder 290 slidably mounted in holder supports 292. Sliding movement of holder 290 is effected by activation of cylinder 294. Two pairs of clamping jaws 296 are pivotally mounted to clamp holder 290. The clamping jaws 296 are opened and closed by activation of cylinders 298.

The operation of the illustrated clamp mechanism 286 is as follows. When a pallet load of material is to be raised to a position adjacent conveyor 250, cylinder 294 is activated to retract clamping mechanism 286 toward frame member 278 (from the extended position shown in FIG. 16). Clamping jaws 296 are thus removed from the vertical path of travel of the extended edge 282 of spacing sheet 166 while the pallet load is being raised into position. When the pallet load is in position for unloading a layer as in FIGS. 13 and 15, the spacing sheet underlying the top layer is in the position shown in FIG. 16, with the clamping mechanism 286 in the retracted position with the jaws 296 open. Cylinder 294 then extends clamp holder 290 such that the open jaws 296 in each pair of jaws are respectively above and below the extended edge 282 of spacing sheet 166. Cylinders 298 are then extended on each jaw to thus close each pair of jaws 296 on the extended edge of the spacing sheet. The extended edge 282 of the respective spacing sheet 166 is thus firmly held by the jaws 296 while the layer overlying the respective spacing sheet is being removed.

After the overlying layer has been removed from spacing sheet 166, jaws 296 are opened by activating cylinders 298, and clamping mechanism 286 is retracted by retracting cylinder 294. Clamp holder 290 is shown in phantom outline in the retracted position in FIG. 16. The spacing sheet is then removed by spacing sheet remover 214, and the clamping mechanism 286 is ready to receive another spacing sheet 166. When using the clamping mechanism 286 in the depalletizing process, relatively thinner spacing sheets can be selected for use in the pallet loads, since no abutment is necessary. In that event, the minimum thickness is that thickness of the spacing sheet which still provides durability to the sheet, and enough rigidity to support its own weight for the distance which the sheet extends beyond the side of the load. Thus the extended edge 282 must project outwardly to be gripped by clamps 296. In some cases, an extruded plastic sheet, as of for example, high density polyethylene, polystyrene, or polypropylene, about 20 mils thick is an acceptable spacing sheet for use with materials which need not afford themselves of channels as at 170 in spacing sheet 166. These spacing sheets may have oversize dimensions, exceeding those respective dimensions of the load, so they project extended edges for interfacing with clamps 296, or the like.

In some applications of the invention, where (i) the material being handled has a thick enough section to obviate use of channels 170, where (ii) recycling a thicker section, heavy spacing sheet is not practical, and where (iii) the top of the underlying layer surface is even enough that one need not use weight of the spacing sheet to provide an even surface for the depalletizing operation; then the palletizing-depalletizing methods of the invention can be practiced using relatively thin-section tacky spacing sheets 300 which are, in the palletizing process, bonded to the top surface of the underlying layer.

Such spacing sheets may have a substrate layer 304 of e.g. regular tie sheet paper having the above illustrated basis weight of about 40-200 lbs./ream. Heavier paper is also acceptable. Another acceptable substrate is the above described sheet of plastic, which, in the case of using adhesive can be less than 20 mils thick, e.g. as low as 2 to 10 mils thick. Other thin section substrate materials will now be obvious to those skilled in the art.

The tacky spacing sheet 300 preferably has bending/flexing properties, and elongation properties in both length and width dimensions, which are similar to the same such properties in conventional tie sheets. Namely, the tie sheet, after coating with the adhesive layer to make the tacky spacing sheet of the invention, has an elongation no greater than before applying the coating. Accordingly, the flexing properties and elongation properties of the tacky spacing sheet can resemble those of 40–200 lb./ream tie sheet paper or 6–30 mil plastic. Since the ranges of properties of such materials are well known, for example through publications of The Association of the Pulp and Paper Industry and the Society of Plastics Engineers, they need not be repeated here.

The top surface 308 of the substrate offers a relatively low coefficient of friction "coft" useful for sliding units of material off the load during the depalletizing operation. The bottom surface 312 of the substrate has a layer 316 of a tacky substance coated thereon, such as a low-tack contact adhesive. Optionally a silicone coated release sheet 320 or the like is disposed over the tacky coating before the tacky tie sheet is used in a load.

Tacky coatings for use on paper or plastic sheets are readily available, and the method of application thereto is well known. The preferred coating has low but firm initial tack and low final bond strength. Such low tack adhesive coatings for use in temporary bonding processes are well represented by the adhesives used in Post-It-Notes ® and products having similar functional requirements. Layer 316 can also be a tacky film, such as a pre-formed plastic film.

Further, in the tacky tie sheet substrate layer 304 and tacky layer 316 can comprise the same base polymer and different additive packages. For example, layer 304 can comprise a package of antiblock and/or slip additives while layer 316 comprises tackifying additives which provide the tacky properties.

Figure 17:
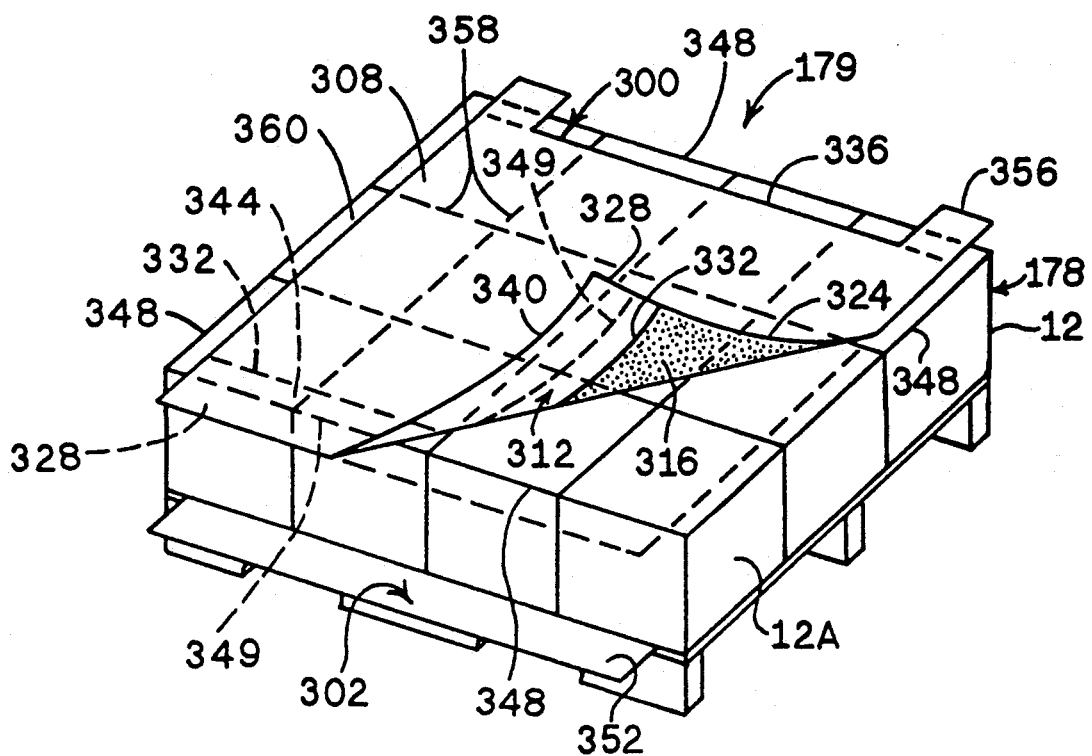
FIG. 17 shows a single layer pallet load, with a tacky spacing sheet on the layer.

FIG. 17 shows a partially built load on a pallet. As seen in FIG. 17, a conventional slip sheet 302, or optionally a tacky spacing sheet 300, underlies a first layer 178 of units of material 12. A tacky spacing sheet 300 overlies the first layer 178 and is shown with one corner lifted up to indicate a first area 324 on the bottom surface 312 of the sheet 300 which overlies the layer of material 178 and a second area 328 on the bottom 312 of the sheet 300 which extends laterally from the layer of material 178 and is devoid of the adhesive. The first area 324 includes a first major segment thereof which is coated with adhesive layer 316, and a second minor segment 344 which is free of adhesive. The first segment is generally defined between sheet edge 336 and line 332 which represents the edge of the coating layer 316 on substrate 304. The first and second areas 324 and 328 of the tacky spacing sheet meet at imaginary line 349 where the sheet 300 overlies the corresponding edge 348 of the underlying layer. Accordingly, the first area 324 of the bottom of the spacing sheet is defined at the time when the spacing sheet is emplaced on the layer 178, between imaginary line 349 and edge 336; and the second area 328 of the bottom of the spacing sheet is defined between imaginary line 349 and edge 340. Layer 316 can be continuous over that portion of area 324 which is coated with adhesive as shown, or can be patterned. Elements of the pattern of the coating can be connected at the substrate layer 304 whereby the pattern is continuous, or can be spaced whereby the pattern is intermittent. The first area 324 corresponds to at least 75%, and typically 85%–90% of the surface area of the tacky spacing sheet. The second, uncoated area 328 of the bottom of the spacing sheet extends outwardly of the load from the corresponding layer edge 348 to edge 340.

In preferred embodiments of the use of tacky spacing sheet 300, that portion of the first area 324 which is coated with tacky adhesive layer 316 is underlain in its entirety by the material of the underlying layer 178, whereby no significant tacky surface is exposed. Likewise, the entire second area 328, if present, is free from functionally effective amounts of adhesive or other tacky material. Typically, the adhesive layer 316 is spaced from the corresponding edge 348 of material layer 178 by the intervening segment 344 which is between line 332 and imaginary line 349.

Figure 18:
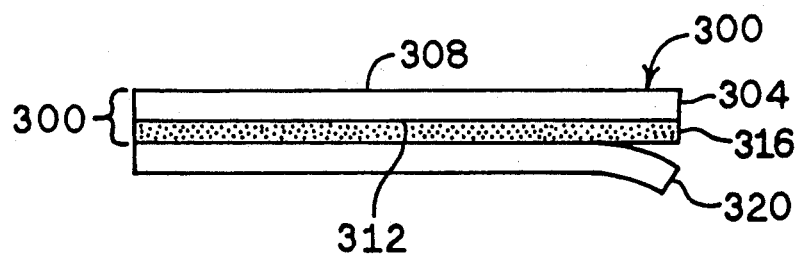
FIG. 18 shows a cross-section of the tacky spacing sheet used in the pallet load of FIG. 17, with part of the release sheet pulled away.

FIG. 18 shows a cross-section of a tacky spacing sheet 300, comprising the substrate layer 304 and the tacky layer 316, combined with release sheet 320. Release sheet 320 protects the tacky layer 316 until the sheet 300 is to be used. As seen in FIG. 17, the spacing sheet 300, in use, includes only layers 304 and 316. Each of layers 304 and 316 can, of course, represent a plurality of layers as is conventionally known in the laminated sheet art, and same is contemplated herein, and included within the scope of the invention.

In the family of embodiments which use the tacky spacing sheet, the tacky spacing sheet is placed on the top surface of the underlying layer with the tacky surface in contact with the underlying layer whereupon the tacky layer 316 lightly bonds the spacing sheet to the underlying surface (e.g. pallet or layer) upon the application of modest downward pressure thereto. Accordingly, the spacing sheet functions to tie the units of the underlying layer together, whereby they stabilize each other. It also facilitates sliding removal of the overlying layer in accordance with the relatively low coefficient of friction offered by its (first) top surface.

Referring now to the above stated step of retaining the spacing sheet on the load while its overlying layer is being removed, the instant tacky spacing sheets illustrate further means of achieving the coefficient of friction differential between the top surface (coft) and the tacky bottom surface (cofb), wherein the adhesive bonding of the tacky spacing sheet 300 to the underlying layer 178 serves the same purpose as a high "cofb" that prevents sliding of the spacing sheet (namely retaining it on the load) as the overlying layer is being pushed off.

The method of using the tacky spacing sheet is generally the same as that of using the other described spacing sheets. The sheet is placed either on the underlying pallet, or on the previously formed underlying layer. If the tacky spacing sheet includes a release sheet 320 on the tacky coating 316, the release sheet is stripped away to expose the surface of the tacky coating 316 before the spacing sheet, comprising layers 304 and 316, is placed on the top surface of the respective layer.

After the tacky spacing sheet has been placed, the next layer of the load is placed on top of the tacky spacing sheet, on low friction surface 308, and the process is repeated until the desired number of layers have been incorporated into the load.

When the load incorporating the tacky spacing sheet is to be depalletized, it is not necessary to restrain the spacing sheet by any mechanical means such as abutment with retainer 270 or holding by clamp mechanism 286. Rather, the tacky spacing sheet is secured in position and adequately restrained by the bond between the spacing sheet and the underlying layer. Retainer 270 can abut the material of the underlying layer if so desired, to restrain the material from moving with the overlying layer as the overlying layer is removed.

Because the tacky spacing sheet need not be grasped, abutted, or otherwise mechanically restrained during the depalletizing operation, the tacky spacing sheet does not need to extend laterally from the material load in any given direction for the purpose of assuring maintaining of its position during palletizing or facilitating restraint during depalletizing. Extended edges can, of course be used, as at 352, for other purposes such as to provide a ramp disposed toward the removal conveyor.

The size of the tacky spacing sheet can thus be so small as to cover somewhat less than the entire area of the underlying layer so long as it provides, in combination with any exposed portion (e.g. 360) of the top surface of the respective layer, a functionally effective surface for sliding removal of the overlying layer. In some embodiments, the primary function of the tacky spacing sheet is to bond together the units of material in the underlying layer. In some such embodiments, the sliding properties of the top surface are not important and can be degraded.

Generally, the area covered by the coating layer 316 is limited to no more than the area of the tacky spacing sheet which will overlie the surface of the underlying layer. As a result, no extensive portion of coating layer 316 will generally be exposed after placement of the tacky spacing sheet, whereby the coating layer 316 will not interfere with other operations.

The tacky spacing sheet 300 can have extended edges or tabs 356 which extend from the load, e.g. from extensions of edge 336 outwardly, but these generally will be devoid of coating 316. Such edges or tabs are readily grasped and pulled when the tacky spacing sheet is to be removed from the underlying layer.

The tacky spacing sheet is generally removed from the underlying layer prior to separation of the units of material 12 to which it is bonded. The low bond strength between the tacky spacing sheet and the underlying articles allows for ready removal of the spacing sheet by pulling the spacing sheet e.g. upwardly or folded back on itself, and away from the bonding locus on the underlying articles; this generally representing a peeling operation as illustrated in FIG. 17. Alternatively, the spacing sheet can be left bonded to the underlying articles, and severed at locations between the articles (e.g. at dashed lines 358) when the articles are to be separated from each other, so as to release some or all of the articles from each other by such severing of the tacky spacing sheet into a plurality of pieces.

As suggested by FIG. 17, a portion of spacing sheet 300 can be lifted from a corresponding portion of the underlying layer 178, thereby releasing at least one unit of material (e.g. carton 12A) while continuing to bond together the rest of the units. The released unit(s) can be separated from the layer while the still-bonded balance of the layer is held intact, and the sliding properties of the top surface 308 of the spacing sheet continue to dominate the top surface of the layer.

Another feature of tacky spacing sheet 300 is that a layer 178 can be removed from the load 179 with the tacky spacing sheet 300 still in place in overlying relation to the layer, and still bonded thereto, whereby the layer retains its singular identity as a layer unit, and accordingly retains the combined activity of its units of material.

The tacky spacing sheet is thus peeled off, or otherwise released from the layer as a unit subsequent to the separation of the corresponding layer from the load or the pallet, as applies. Accordingly, the tacky spacing sheet can be removed from the layer (as by peeling), by an operator or by mechanical means, outside the relatively more hazardous unloading areas within the perimeter defined by posts 280. In a preferred such operation, the edges of the tacky spacing sheet 300 are disposed inwardly of all the corresponding edges 348 of the layer. The layer is pushed from the load (or pallet) as a unit in the unloading area such as defined between posts 280 in the depalletizer, with the tacky spacing sheet 300 still in place on top of the layer. The layer is transported intact out of the unloading area. The units of material 12 (FIG. 17) are released from the layer, as by peeling away of the tacky spacing sheet or severing of the tacky spacing sheet as described above, subsequent to removal of the layer from the unloading area of the depalletizer. The layer, or units of the layer, can be acted upon, manipulated, and/or otherwise treated and/or used as desired after the layer leaves the unloading area and before all of the units are released from the layer or the successor layer portions which define what is left of the layer when some but not all of the units are released and removed from the layer.

From the above, it is seen that the tacky spacing sheet 300 is distinguishable from conventional tie sheets and slip sheets in that it facilitates the handling of both the overlying layer 178 of material and the underlying layer of material, while facilitating the depalletizing operation. With respect to the overlying layer, tacky spacing sheet 300 supports the layer, and its effectively low coefficient of friction facilitates sliding removal of the overlying layer from the spacing sheet. With respect to the underlying layer, the spacing sheet 300 serves as the mechanism that bonds the units of material 12 to each other. The thus combined units of material tend to act in common, through the spacing sheet 300, to resist outside forces directed against any one or more units of material in the layer. The result is that the layers which are made up of the thus combined units of material are more stable than layers wherein the respective overlying sheets are not bonded to the underlying units of material; and the loads made up of the so bonded layers are more stable than loads made with similar but unbonded layers. Further, the layer can be removed from the load with the layer being held intact by the overlying spacing sheet, whereby the layer can be maintained intact, as a subassembly of the load, after depalletizing. The thus intact layer can be acted upon, manipulated, or otherwise treated after it has been removed from the load and before the break-up of the load into its units of material.

With respect to both underlying and overlying layers, the tacky spacing sheet 300 need not be restrained or otherwise secured, by external means, to the underlying layer before placement of the overlying layer thereon, even though it is typically light weight, because the releasable adhesive bonds hold it in place.

Thus the invention comprises the use of the team of machines comprising the palletizer 10 and the depalletizer 210 as a system, with the appropriate spacing sheet, for handling material which may be thin in section and/or compressible or may be thicker as with stacked magazines or conventional cartons; and where the material is palletized and subsequently depalletized mechanically, without the requirement to use manual lifting labor to handle the units of material so palletized and depalletized. The proper operation of the team of machines depends heavily on (i) using layer thicknesses no greater than that which can be readily pushed off a pallet load, with appropriate acceleration and deceleration, without destabilizing the layer, and (ii) in the use of a spacing sheet which is compatible with use in the depalletizer with the respective units of material which make up the load. For thin section unit loads such as either unbundled sheets of paper, newspapers, or newspaper sections, spacing sheets having especially the channels 170 are important for being able to ensure the depalletizing of the bottom-most layers. In this case, a sheet of paper, or respectively a newspaper, is considered a load unit.

Where the load unit is thicker, such as about 0.25 inch thick, as in books, or some magazines, then channels 170 may be omitted and a thinner spacing sheet may be preferred. So long as the load unit (i.e. a magazine) is at least about 0.25 inch thick, the terminal edge 278 of pusher 254 (with or without fingers 266) can be positioned adequately below the top of the lowermost load unit, to thus be able to push it, while still being acceptably spaced above the top of the spacing sheet. Typically, a Masonite board is thinner and therefore easier to handle than the spacing sheet 166 described for the channeled embodiment. It also requires relatively less capital investment. An extruded plastic sheet is thinner yet, with corresponding capital savings. Holding mechanism 286 is readily used for holding a Masonite board such as 161, or the plastic sheet which includes the respective edge extension as seen at 282 in FIG. 16. The tacky spacing sheet requires neither abutment thicknesses nor edge extensions, but obtains its stability through its bonding with the underlying layer.

For reasons of economy, where the unit load is thick enough, plain spacing sheets as at 161, or the corresponding plain plastic extruded sheets, or the tacky spacing sheet, are preferred. Fingers 266 of pusher 254 can push the bottom layer of, for example, magazines and can reliably remove the entire layer. Where the unit load is thinner, or where a thicker unit load such as a newspaper can be easily compressed to a thinner cross-section, then the channelled spacing sheet 166 is used, so that fingers 266 can reach below the bottom surface of the load, into the spacing sheet channels, to help ensure the removal of the entire layer.

Within the context of this invention a layer of product/material may be fairly thin, or could be relatively thick. The systems and methods of the invention are readily adapted for handling articles of essentially any thickness upon selection of the proper spacing sheet as illustrated above.

Also within the context herein, a pallet load may consist of a single layer (or part of a layer), or it may have two or more layers.

Wherever herein a spacing sheet is disclosed for use under a first layer, a pallet having the same top surface characteristics as a spacing sheet described for that application, and wherein the top surface is sufficiently rigid to carry the load, may be substituted. Indeed, the pallet surface need not be channeled. It may be smooth, as appropriate for the material of the load, similar to the disclosed Masonite or plastic or tacky spacing sheets.

Thus it is seen that the invention provides a method of placing layers of material on a supporting surface, such as a pallet, having a supporting member, and subsequently moving that material to another location, with optional intermediate storage, and removing the material from the pallet by sliding it off the supporting member. It is further seen that the use of a tacky spacing sheet helps to stabilize the underlying layer, and obviates need for any machinery restraint on the spacing sheet when the overlying layer is removed.

The term "supporting surface" includes the "supporting members" herein, which are those members having the novel characteristics of the spacing sheets 161, 166, and 300 herein disclosed, as well as the extruded plastic sheets and the tacky spacing sheets.

The invention is seen to provide a material handling system including a palletizer, a depalletizer, and appropriately selected spacing sheets, which system is capable of handling material including books, magazines, and compressible stacks of newspapers in both the palletizing and depalletizing functions without any need for manually lifting of the material so handled. The system is also fully capable of palletizing and depalletizing conventional units of material such as cases and shippers of product. The invention is especially adapted to handling products, or piece parts, or subassemblies which need in-process storage, or temporary storage before shipment.

The invention further provides novel material loads, especially advantageous for use in handling material, especially in automated processes for handling materials.

Those skilled in the art will now see that certain modifications can be made to the spacing sheets, and the material handling systems and methods herein disclosed with respect to the illustrated embodiments without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A material load, comprising:
   (a) support means, including a supporting surface;
   (b) a plurality of units of material disposed on said supporting surface, said plurality of units of material, in combination, defining a layer of said units of material; and
   (c) a spacing sheet overlying said layer of said units of material, whereby said units of material underlie said spacing sheet, said spacing sheet comprising a first layer made with a substrate material, and a second layer comprising an adhesive, said second layer being bonded to said underlying units of material by adhesive bonds formed between said units of material and said spacing sheet,
   whereby said underlying units of material are connected to each other by said spacing sheet such that said connected units of material tend to resist outside forces directed against any one or more of said so connected units of material.

2. A material load as in claim 1, said spacing sheet comprising a first layer, and a tacky layer secured to said first layer, said units of material being connected to each other by said tacky layer.

3. A material load as in claim 2, said tacky layer comprising a pre-formed layer of a tacky plastic.

4. A material load as in claim 1, and further comprising a second said layer of said units of material overlying said spacing sheet, said spacing sheet comprising a top surface, said top surface having a coefficient of friction "coft" compatible with sliding removal of said second overlying layer, whereby said second overlying layer can be pushed off said spacing sheet with concurrent holding of said spacing sheet to said underlying layer by said bonds.

5. A material load as in claim 4, and further comprising a second said spacing sheet overlying said second layer of said units of material, said units of material in said second layer underlying said second spacing sheet and being bonded to said second spacing sheet by adhesive bonds formed between said second spacing sheet and said units of material in said second layer, whereby said units of material in said second layer are connected to each other by said second spacing sheet.

6. A material load as in claim 1 wherein said bottom surface of said spacing sheet is bonded to said units of material with releasable adhesive bonds such that said spacing sheet can be released from said underlying layer of material by peeling said spacing sheet away therefrom.

7. A material load as in claim 1 wherein said tacky spacing sheet is substantially flexible under bending stresses.

8. A method of handling material on a supporting surface, said method comprising the steps of:
(a) placing on said supporting surface a set comprising a plurality of units of material, said plurality of units of material, in combination, comprising a layer of units of material on said supporting surface, said units of material comprising tops, said tops of said units of material, in combination, comprising a top of said layer;
(b) placing a tacky spacing sheet on said top of said layer such that said units of material underlie said tacky spacing sheet, said tacky spacing sheet having a tacky bottom surface, said tacky bottom surface being adapted to releasably adhesively bond to said tops of said units of material; and
(c) adhesively bonding said tacky spacing sheet to said underlying units of material by forming adhesive bonds between said units of material and said tacky spacing sheet,
whereby said units of material are connected to each other by said tacky spacing sheet, and tend to resist outside forces directed against any one or more of said so adhesively bonded units of material.

9. A method of handling material as in claim 8 and including the steps, subsequent to step (c), of
(d) breaking adhesive bonds between said spacing sheet and said underlying units of material, and thereby releasing and removing said so bonded spacing sheet from said plurality of units of material; and
(e) removing said plurality of units of material from said supporting surface.

10. A method of handling material as in claim 8 and including the steps of
(d) removing said layer, as a unit, from said supporting surface while said tacky spacing sheet is bonded to said underlying units of material; and
(e) subsequent to step (d), releasing said units of material from said layer by breaking adhesive bonds between said spacing sheet and said underlying units of material, and thereby releasing the respective said units of material from said tacky spacing sheet.

11. A method of handling material as in claim 8, said tacky spacing sheet comprising a first tacky spacing sheet having a top surface, said top surface having a coefficient of friction "coft" due to intrinsic properties thereof compatible with sliding removal of ones of said units of material therefrom, said set comprising a first set, said layer comprising a first layer, said method further comprising:
(d) placing a second said set of said plurality of units of material on said first tacky spacing sheet and, accordingly, on said first layer, thereby forming a second layer disposed on said first tacky spacing sheet and said first layer, said second layer having a top;
(e) placing a second said tacky spacing sheet on said top of said second layer such that said second set of units of material underlies said second tacky spacing sheet; and
(f) bonding said second tacky spacing sheet to said top of said second layer, with bonds between said second tacky spacing sheet and said second set of said plurality of units of material,
whereby the resulting assemblage comprises two said layers of said units of material, one overlying the other, and a tacky spacing sheet overlying each said layer, said underlying units of material in each said layer being connected to each other by the respective overlying tacky spacing sheet.

12. A method of handling material as in claim 11 and including the steps of
(g) pushing said second layer off said first tacky spacing sheet,
said bonds between said first tacky spacing sheet and said plurality of units of material of said first layer being effective to hold said first tacky spacing sheet to said first layer while said second layer is being pushed off said first tacky spacing sheet.

13. A method of handling material as in claim 11 and including the steps of
(g) removing said second layer, as a unit, from said first tacky spacing sheet while said second tacky spacing sheet is bonded to said underlying second set of said units of material; and
(h) subsequent to step (g), releasing said second set of said units of material from said second layer by releasing the respective said units of material from said bonding so effected by said second overlying tacky spacing sheet.

14. A method of removing material from a material load comprising one or more layers, said method comprising the steps of:
(a) selecting a material loading having one or more said layers, and including a first said layer, said first layer comprising (i) a set comprising a plurality of units of material, said plurality of units of material, in combination, comprising a load portion of said first layer, said plurality of units of material having tops, said tops of said plurality of units of material, in combination, comprising a top of said load portion of the first layer, and (ii) a tacky spacing sheet removably adhesively bonded to said tops of said plurality of units of material and thereby to said top of said load portion of said first layer;

(b) breaking adhesive bonds between said spacing sheet and said underlying units of material, thereby releasing said so bonded tacky spacing sheet from said tops of said plurality of units of material; and (c) removing at least one of said plurality of units of material from said first layer.

15. A method of removing material from a material load as in claim 14, said removing in step (c) comprising pushing at least one of said plurality of units of material off said material load.

16. A method of removing material from a material load as in claim 14 and including, prior to steps (b) and (c), the step of:

(d) removing said first layer from said material load.

17. A method of handling material on a pallet, said method comprising the steps of:

(a) palletizing said material by (i) loading units of said material on a pallet in layers, said layers having top surfaces, (ii) placing a tacky spacing sheet on top of each said layer whereby a layer comprising said units of material underlies each said tacky spacing sheet, and conversely a tacky spacing sheet overlies each said layer, said tacky spacing sheets having tacky bottom surfaces, said tacky bottom surfaces of said tacky spacing sheets being adapted to releasably bond to said top surfaces of corresponding ones of said layers, and (iii) bonding said tacky spacing sheets to respective ones of said underlying units of material and thereby to said underlying layers, whereby said units of material in said layer are connected to each other by the respective said tacky spacing sheet and thus tend to resist outside forces directed against any one or more of said so bonded units of material in said layer, thereby creating a pallet load having a first layer, and a first said spacing sheet overlying said first layer; and (b) depalletizing said material by (i) removing said overlying bonded first tacky spacing sheet from said first layer, and thereby releasing elements of said units of material of said first layer from said overlying first tacky spacing sheet, (ii) removing at least one unit of material comprising said first layer from said pallet load, and (iii) separating ones of said previously so bonded units of material, comprising said first layer, from each other, thereby disassembling said first layer into elements smaller than said first layer.

18. A method as in claim 17 and including, prior to steps (b) (i), (b) (ii), and (b) (iii), the step of removing said first layer from said pallet load while said first tacky spacing sheet is bonded to said underlying units of material of said first layer.

19. A method of removing material from a material load comprising one or more layers, said method comprising the steps of:

(a) selecting said material load having one or more said layers, and including a first layer, said first layer comprising (i) a set comprising a plurality of units of material, said plurality of units of material, in combination, comprising a load portion of said first layer, said plurality of units of material having tops, said tops of said plurality of units of material, in combination, comprising a top of said load portion of said first layer, and (ii) a spacing sheet secured to said tops of said plurality of units of material and thereby to said top of said load portion of said first layer;

(b) removing said first layer, as a unit, from said load, while said spacing sheet is secured to said underlying units of material; and (c) subsequent to step (b), severing said spacing sheet into a plurality of pieces to thereby release ones of said units of material from each other, and from corresponding said pieces of said spacing sheet.

* * * * *